2,795,581

PIPERIDINE COMPOUNDS AND THEIR PRODUCTION

Edward S. Stern and Ronald J. Anderson, Edinburgh, Scotland, assignors to J. F. Macfarlan & Co. Limited, Boreham Wood, England, a British company No Drawing. Application January 24, 1955, Serial No. 483,820

Claims priority, application Great Britain February 23, 1954

11 Claims. (Cl. 260—247.2)

This invention relates to novel piperidine compounds and their production.

The invention provides novel derivatives of norpethidine and acid addition salts of said derivatives of the general formula:

where XN— is the residue of a substituted or unsubstituted heterocyclic, preferably non-aromatic, base XNH which contains the >NH group as a part of the ring system, and —R— is the residue of a straight or branched chain aliphatic hydrocarbon containing from one to four carbon atoms. Preferably XN— is the residue of piperidine, morpholine or pyrrolidine, which may, if desired, be substituted.

The norpethidine derivatives of the invention are useful as spasmolytics and analgesics.

Compounds of the above general formula in which XN— is the residue of morpholine possess outstanding analgesic potency. Clinical trials of morpholinoethylnorpethidine have shown that this compound is three to seven times as active as pethidine and approaches morphine in activity; it lacks some of the unpleasant side effects which mark the activity of many analgesics.

According to the invention the new derivatives can be made by reacting a compound of the general formula XN—Y with a compound of the general formula:

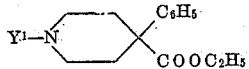

where XN— has the meaning defined above and one of the radicals Y and Y¹ represents the radical —R—Z, where —R— has the meaning defined above and Z denotes chlorine, bromine or iodine, or the hydroxyl group, and the other of the radicals Y and Y¹ denotes a hydrogen atom.

According to the invention also, in cases where the residue XN— is not too labile, the new derivatives can be prepared from a compound of the general formula:

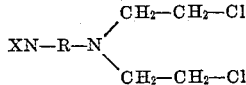

where XN— and —R— have the above-defined meaning, by condensing it with benzyl cyanide in the presence of an agent capable of splitting off hydrogen chloride, so as to form the compound

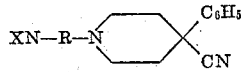

and converting the CN group of the latter into

by hydrolysis and esterification. Particularly this process is applicable where XN— is the residue of a substituted or unsubstituted piperidine or pyrrolidine.

The following examples illustrate the production of the derivatives of the invention:

*Example I.—Ethyl-4-phenyl-1-morpholinoethylpiperidine-4-carboxylate (morpholinoethylnorpethidine)*

Ethyl-4-phenylpiperidine-4-carboxylate (norpethidine) (10 parts) in alcoholic solution is mixed with a solution containing one equivalent of chloroethylmorpholine (from 8 parts of the hydrochloride). The mixture is maintained at the boiling point for one hour and the alcohol removed by vacuum distillation. On addition of 20% w./v. ethanolic hydrogen chloride, morpholinoethylnorpethidine dihydrochloride is precipitated in almost quantitative yield. After crystallisation from aqueous ethanol the dihydrochloride has M. P. 264–266° C. (with decomposition). (Found: N 6.66%; Cl 16.9%. $C_{20}H_{32}O_3N_2Cl_2$ requires: N 6.68%; Cl 16.9%).

*Example II.—Ethyl-4-phenyl-1-piperidinoethylpiperidine-4-carboxylate (piperidinoethylnorpethidine)*

Ethyl-4-phenylpiperidine-4-carboxylate (norpethidine) hydrochloride (7.5 parts) is dissolved in alcohol and neutralised with an alcoholic solution of sodium (0.64 part); a solution of chloroethylpiperidine (one equivalent) in alcohol is then added and the mixture refluxed for five hours. The solution is concentrated and 20% w./v. ethanolic hydrogen chloride is added, whereupon ethyl-4-phenyl-1-piperidinoethylpiperidine-4-carboxylate dihydrochloride crystallises in almost quantitative yield. On crystallisation from aqueous ethanol the dihydrochloride has M. P. 268–269° C. (with decomposition). (Found: N 6.75%; Cl 17.2%. Calculated: N 6.7%; Cl 17.0%).

*Example III.—Ethyl-4-phenyl-1-piperidinoethylpiperidine-4-carboxylate (piperidinoethylnorpethidine)*

Piperidinoethyl chloride and diethanolamine (equivalent quantities) are warmed in ethyl acetate and the product is chlorinated by addition of thionyl chloride (1.15 equivalents) in ethyl acetate. The resulting di-(2-chloroethyl)-piperidinoethylamine hydrochloride is neutralised with aqueous sodium bicarbonate and the base thus generated extracted into xylene and condensed with sodamide and benzyl cyanide in xylene solution at 90° C. The product is treated with water, the base remaining in the xylene phase; the organic phase is separated and the xylene (and any water) removed by vacuum distillation. The base remaining is hydrolysed by 90% sulphuric acid at 130° C. and the 1-piperidinoethyl-4-phenyl-isonipecotic acid is esterified by azeotropic distillation with ethanol and xylene. Finally, the ethanolic solution is neutralised and concentrated, and ethyl-4-phenyl-1-piperidinoethylpiperidine-4-carboxylate dihydrochloride, M. P. 267–268° C. (with decomposition), is precipitated with ethanolic hydrogen chloride.

*Example IV.—Pyrrolidinoethylnorpethidine*

Pyrrolidine (28 parts) and ethylene chlorhydrin (22 parts) were dissolved in ethyl acetate and allowed to reflux gently on a steam bath for 2½ hours. After cooling, thionyl chloride (30 parts) was added to the mixture in portions with shaking. When addition was complete, the mixture was refluxed for two hours during which time there was a copious evolution of hydrogen chloride. The resulting chloroethyl pyrrolidine hydrochloride (cf. Wright, Kolloff, and Hunter, J. Amer. Chem. Soc., 1948, 70, 3098; Tilford, Shelton and Van Campen, ibid., 1948, 70, 4001), was separated and converted into the base. Chloroethylpyrrolidine base (5.5 parts) in ethanol was mixed with norpethidine (9.5 parts) and the solution refluxed for four hours. Isolation and purification of the product were as in Example I above. The pure product melted at 259–262° C. (decomp.). (Found: C 59.0; H 8.0; N 7.15; Cl 17.65%. $C_{20}H_{32}O_2N_2Cl_2$ requires: C 59.5; H 7.9; N 6.95; Cl 17.58%).

*Example V.—4-phenyl-4-carbethoxypiperidinoethyl-norpethidine*

Norpethidine (20 parts) and ethylene chlorohydrin (6 parts) were dissolved in ethyl acetate and refluxed gently on a steam bath for 2½ hours. After cooling, thionyl chloride (8 parts) was added slowly with shaking. When addition was complete the solution was refluxed for a short time until the contents of the flask solidified. The hydrochloride of chloroethylnorpethidine was filtered off, washed with ethyl acetate and dried. The pure product melted at 219–220° C. (decomp.). Found: C 58.4; H 6.9; N 4.03; Cl 21.4%. $C_{16}H_{23}O_2NCl_2$ requires: C 57.8; H 6.9; N 4.22; Cl 21.4%.

Chloroethylnorpethidine base (5 parts) and norpethidine (3.94 parts) were dissolved in ethanol and the solution was refluxed for four hours. The product was isolated and purified as in Example I above. The pure product had a melting point of 241–243° C. Found: C 62.9; H 7.37; N 4.73; Cl 12.5%. $C_{30}H_{42}O_4N_2Cl_2$ requires: C 63.7; H 7.4; N 4.96; Cl 12.57%.

*Example VI.—Piperazinoethylnorpethidine*

Chloroethylnorpethidine (55 parts) was mixed with piperazine (36 parts) in ethanol and the mixture refluxed for four hours on a steam bath. Isolation and purification of the product were as in Example I above. The pure product had a melting point of 244–246° C. Found: C 54.0; H 7.6%. $C_{20}H_{34}O_2N_3Cl_3$ requires: C 52.9; H 7.5%.

*Example VII.—1-morpholinoprop-2-yl-norpethidine*

Morpholine (77 parts), propylene chlorohydrin (1-chloropropan-2-ol) (37 parts) and potassium iodide (2 parts) were added to ethanol (80 parts) and refluxed with stirring for twelve hours. To the resulting mixture was added a solution of sodium (9 parts) in ethanol (100 parts). The mixture was filtered and distilled through a Vigreux flask at the water pump. The fraction boiling between 95 and 102° C./13 mm. was collected (cf. Attenburrow, Elks, Hems and Speyer, J. Chem. Soc., 1949, 510; and Brown, Cook and Heilbron, J. Chem. Soc., 1949, S111). The resulting 1-morpholinopropan-2-ol (20 parts) was dissolved in ethyl acetate (100 parts) and thionyl chloride (30 parts) was added gradually with stirring. The solution was then refluxed for one hour and cooled, when the hydrochloride of 1-morpholinoprop-2-yl chloride precipitated. The substance had a melting point of 174–177° C. when pure (cf. Attenburrow, et al., J. Chem. Soc., 1949, 510; Brown, Cook and Heilbron, J. Chem. Soc., 1949, S111). Norpethidine (5 parts) and 1-morpholinoprop-2-yl chloride hydrochloride (4.3 parts), neutralised with sodium (0.5 part) in alcohol, were mixed in alcohol and refluxed for four hours. The product was isolated and purified in the usual manner. The pure product had a melting point of 235–237° C. Found: C 57.7; H 7.9; N 6.8%. $C_{21}H_{34}O_3N_2Cl_2$ requires: C 58.2; H 7.9; N 6.5%.

*Example VIII.—3-morpholinopropylnorpethidine*

Morpholine (67 parts), 3-chloropropanol (33.5 parts) and potassium iodide (3 parts) were refluxed in ethanol (80 parts) for twenty-four hours with stirring. The flask was then cooled and a solution of sodium (9 parts) in ethanol (150 parts) was added and the mixture filtered. After removal of the solvent the residue was distilled from a Vigreux flask at the water pump. The product boiled between 124 and 126° C./13 mm. (cf. Clinton, Salvador and Laskowski, J. Amer. Chem. Soc., 1949, 71, 3366). 3-morpholinopropan-1-ol (26 parts) was dissolved in benzene (250 parts) and thionyl chloride (60 parts) was added slowly with stirring. The solution was then refluxed for one hour and cooled when the 3-morpholinopropyl chloride precipitated. The substance had a melting point of 164–166° C. when pure (cf. Adams and Whitmore, J. Amer. Chem. Soc., 1945, 67, 735). Norpethidine (5 parts) and 3-morpholinopropyl chloride hydrochloride (4.3 parts), neutralised with sodium (0.5 part) in ethanol, were mixed in ethanol and refluxed for four hours. The product was isolated and purified in the usual manner. The pure product had a melting point of 240° C. Found: C 54.9; H 7.9; N 6.4; Cl 15.9%. $C_{21}H_{34}O_3N_2Cl_2$ requires: C 58.2; H 7.9; N 6.47; Cl 16.3%.

*Example IX.—4-methylpiperidinoethylnorpethidine*

Chloroethylnorpethidine (27 parts) was mixed with 4-methylpiperidine (10 parts) in ethanol and refluxed for four hours. The product was isolated and purified as before. The pure dihydrochloride had a melting point of 270–272° C. (decomp.). Found: C 61.25; H 7.9; N 6.3%. $C_{22}H_{36}O_2N_2Cl_2$ requires: C 61.24; H 8.4; N 6.5%.

*Example X.—$\Delta^3$-Tetrahydropyridinoethylnorpethidine*

Chloroethylnorpethidine (26 parts) was mixed with $\Delta^3$-tetrahydropyridine (10 parts) in ethanol and refluxed for four hours. The product was isolated and purified in the usual manner. The pure substance melted at 257–259° C. (decomp.). Found: C 59.6; H 7.35; N 6.75%. $C_{21}H_{32}O_2N_2Cl_2$ requires: C 60.7; H 7.7; N 6.75%.

*Example XI—Morpholinomethylnorpethidine*

To ice-cold hydroxymethylmorpholine, prepared from morpholine by the method of Zeif and Mason (J. Org. Chem., 1943, 8, 1), was added an equimolar portion of norpethidine. After thorough mixing, anhydrous potassium carbonate (0.1 molar equivalent) was added and the mixture was kept for twenty-four hours. The product was isolated by dissolution in ethanol, filtration, drying and conversion into hydrobromide which had a melting point of 198° C.

What we claim is:

1. A compound selected from the group consisting of a derivative of norpethidine of the general formula

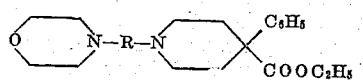

where R is an alkylene radical containing from one to four carbon atoms and an acid addition salt of said derivative of norpethidine.

2. 4 - carbethoxy-1-(beta - morpholinoethyl)-4-phenylpiperidine.

3. 4-carbethoxy-1-(alpha-methyl - beta - morpholinoethyl)-4-phenylpiperidine.

4. 4-carbethoxy - 1 - (gamma - morpholinopropyl)-4-phenylpiperidine.

5. 4-carbethoxy-1-morpholinomethyl - 4-phenylpiperidine.

6. The process for the production of norpethidine derivatives which comprises reacting 4-carbethoxy-4-phenylpiperidine with a compound of the general formula

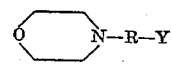

where R is an alkylene radical containing from one to four carbon atoms and Y is a radical selected from the group consisting of chlorine, bromide, iodine and hydroxyl.

7. The process for the production of norpethidine derivatives which comprises reacting morpholine with a compound of the general formula:

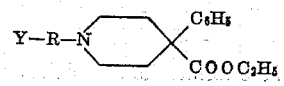

where —R— is an alkylene radical containing from one to four carbon atoms and Y is a radical selected from the group consisting of chlorine, bromide and iodine and hydroxyl.

8. The process for the production of 4-carbethoxy-1-(beta-morpholinoethyl)-4-phenylpiperidine, which comprises reacting beta-morpholino-ethyl chloride with 4-carbethoxy-4-phenylpiperidine and recovering 4-carbethoxy-1-(beta - morpholinoethyl) - 4-phenylpiperidine from the reaction mixture.

9. The process for the production of 4-carbethoxy-1-(alpha - methyl - beta - morpholino-ethyl)-4-phenylpiperidine which comprises reacting alpha-methyl-beta-morpholino-ethyl chloride with 4-carbethoxy-4-phenylpiperidine and recovering 4-carbethoxy-1-(alpha-methyl-beta-morpholino-ethyl)-4-phenylpiperidine from the reaction mixture as the dihydrochloride.

10. The process for the production of 4-carbethoxy-1-(gamma-morpholinopropyl) - 4 - phenylpiperidine which comprises reacting gamma-morpholinopropyl chloride with 4-carbethoxy-4-phenylpiperidine and recovering 4-carbethoxy -1-(gamma-morpholinopropyl)-4-phenylpiperidine from the reaction mixture as the dihydrochloride.

11. The process for the production of 4-carbethoxy-1-morpholinomethyl-4-phenylpiperidine which comprises reacting N-hydroxy methyl-morpholine with 4-carbethoxy-4-phenylpiperidine and recovering 4-carbethoxy-1-morpholinomethyl-4-phenylpiperidine from the reaction mixture.

References Cited in the file of this patent

UNITED STATES PATENTS

| 2,403,903 | Bergel | July 16, 1946 |
| 2,486,793 | Miescher | Nov. 1, 1949 |
| 2,486,794 | Miescher | Nov. 1, 1949 |

OTHER REFERENCES

Giotti: Chem. Abst., vol. 43, col. 4426 (f) 1949.